March 15, 1932. J. W. BRANDT 1,849,360

SADDLE CLAMP

Filed July 17, 1930

Inventor
John W. Brandt
By Slough and Canfield
Attorneys

Patented Mar. 15, 1932

1,849,360

UNITED STATES PATENT OFFICE

JOHN W. BRANDT, OF ELYRIA, OHIO

SADDLE CLAMP

Application filed July 17, 1930. Serial No. 468,691.

My invention relates to cycle saddle clamps and relates more particularly to saddle clamps used for securing a saddle, such as a bicycle, velocipede or motorcycle saddle, to the saddle post of the vehicle.

An object of my invention is to provide means for connecting the saddle to the post which will be economical to manufacture, easy to ship, and convenient and secure in use.

Another object of my invention is to provide a cycle saddle clamp which will be more effective in performing the functions required of the clamps heretofore in use and with which I am familiar.

Another object of my invention is to provide a structure made of sheet metal stampings which will securely grip the saddle post and retain the saddle in correct adjusted position.

Another object of my invention is to provide a cycle saddle clamp which will fit all sizes of seat posts which are commonly used throughout the industry for bicycles, velocipedes, motorcycles, etc.

Another object of my invention is to provide a saddle clamp comprising a plurality of parts which will hold together while being shipped.

Other objects of my invention and the invention itself will become more apparent by reference to the description contained herein and in which description reference will be had to the accompanying drawings forming a part of the specification.

Fig. 1 shows an end elevational view of the saddle clamp of my invention, the parts being in the position they will assume when supporting a saddle upon a saddle post, the saddle post in this view being shown in vertical cross-section as are also the longitudinally extending truss members attached to the saddle, the saddle post being shown in four sizes, five-eighths of an inch being the most common size.

Referring now to the drawings in all of which like parts are designated by like reference characters.

Figure 1:
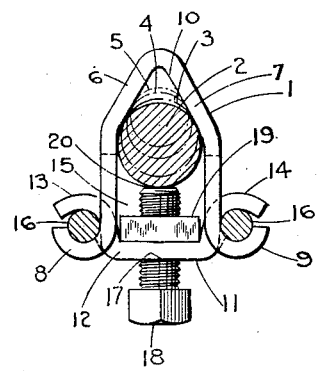
Figure 3:
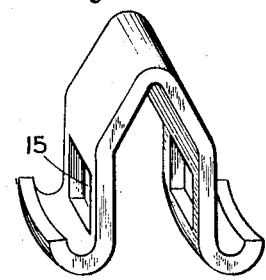
Fig. 3 is a perspective view of one of the saddle members.

At 1 I show a substantially V-shaped clip member which immediately engages the saddle post shown in four different sizes, as indicated at 2, 3, 4, and 5, and the four different showings are dependent upon the relative sizes of the saddle post. The preferred size of five-eighths of an inch for the saddle post is shown in Figure 1 in solid lines. The clip member 1 is formed of the two side arms 6 and 7, which meet in an acute angle at their upper ends and which terminate at their lower ends in outwardly projecting flanges 8 and 9, curved longitudinally as well as outwardly. The saddle post gripping surface 10 of the clip 1 is preferably rough so as to grip more firmly the round, smooth saddle post.

Cooperating with the clip member 1 is an inverted substantially U-shaped member 11 having a flat intermediate portion 12, and upwardly extending arms each of which terminate in truss member gripping extensions 13 and 14, and which are adapted to pass through the elongated opening 15 in the middle portion of the side arms 6 and 7 of the clip 1, as shown, said extensions 13 and 14 cooperating with the flanges 8 and 9 of the clip 1 so as to grip the longitudinally extending truss member 16 attached to the saddle between the clip 1 and the so-called U-shape member 11. The member 11 has a central vertically extending perforation 17 adapted to admit a bolt 18. I also provide a nut 19 adapted to be snugly fitted on the intermediate flat portion 12 of the member 11, said nut being threaded and the threads on the bolt 18 being adapted to cooperate with the threads on the nut 19 so that the bolt 18 may be turned within the nut 19 so as to move the bolt longitudinally of the nut, while the nut is held against turning by engagement with the adjacent upwardly directed extensions 13 and 14.

Figure 2:
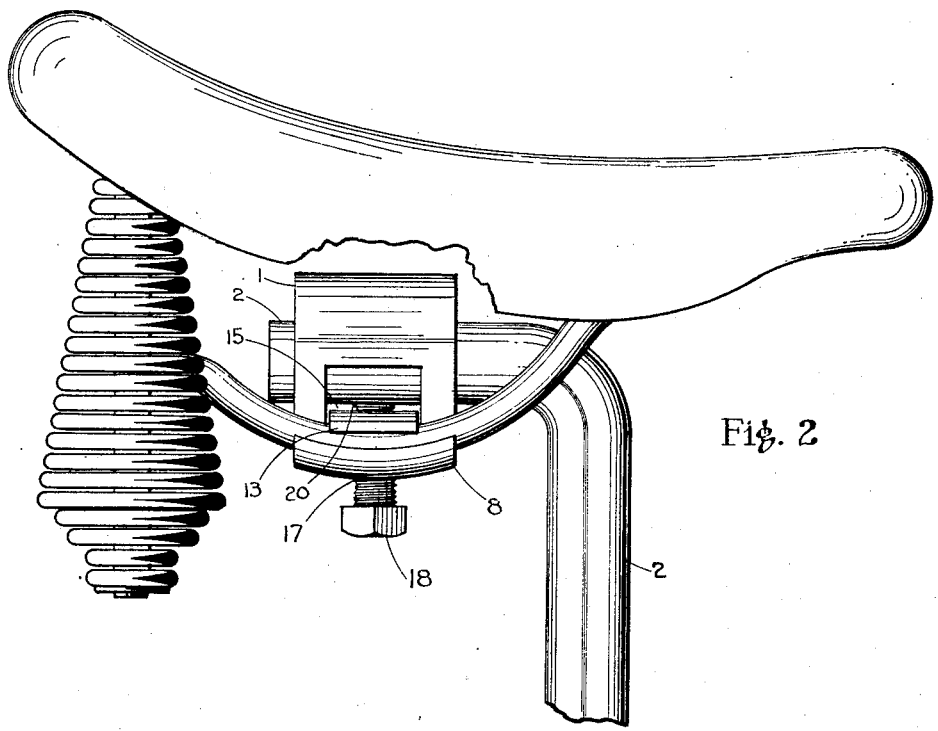
Fig. 2 shows the device in position on a saddle post carrying a saddle.

The saddle is secured to the saddle post by advancing the bolt 18 upwardly through the nut 19 positioned as in Fig. 1 until the end of the bolt contacts, as illustrated in Figs. 1 and 2, with the bottom of the post 2.

At the same time the longitudinally extending truss members 16, which are securely fastened to the saddle, as is the practice, are placed between the jaw extensions 8 and 9 of the clip 1 and 13 and 14 of the U-shaped member 11, and the bolt 18 being tightened up against the bottom of the saddle post 2, by turning the bolt clockwise, and being secured by the nut 19, the saddle post 2 and the truss members 16 will be securely gripped between the clip 1 and the member 11.

It will be particularly noted that in this construction the saddle clamp will fit any size or type of seat post, such as are commonly used in the industry for bicycles, velocipedes, motorcycles, etc., and this is an extremely advantageous improvement as heretofore manufacturers have invariably had to resort to various expedients, such as bushings, etc., to secure the seat to a post of any other than a certain size and form than one precisely fitting the engaged surface of the saddle clamp clip used. Where bushings or the like have been employed, these do not meet the problem because a number of bushings are required to adapt any given clamp for post of various sizes, and at the same time difficulty is had in adapting a bushing for the purpose without decreasing the gripping effect desired to be obtained between the clamp and the post. The additional expense of such bushings is also saved by the present construction. My invention enables various sizes of posts to be used without bushings, as the clamp of my invention will fit securely over a great many different sizes.

It will be seen that in this construction, the clamp can be assembled with the parts in their proper relative position and as so assembled with the nut 19 comparatively tightened on the bolt 18 they will remain together so that all the parts are thus secured together and cannot become lost in shipping.

Having thus described my invention I am aware that numerous and extensive departures may be made therefrom but without departing from the spirit of my invention.

I claim:—

1. In a cycle saddle clamp, a sheet metal stamping generally of U-form, the opposing portions of the arms of the stamping embracing therebetween a substantially wedge-shaped recess, means secured to the stamping providing a screw-thread, a bolt projected through the thread toward the apex of the wedge-shaped recess whereby a cycle saddle post of any diameter within a range of diameters and disposed in the recess may be gripped on three portions of the post by the screw and by opposite sides of the wedge-shaped recess.

2. In a cycle saddle clamp, a pair of sheet metal stampings, each generally of U-form and having laterally extending jaw extensions, one stamping being inverted with respect to the other and having its said extensions projected through apertures in the arms of the other, the opposing portions of the arms of one of the stampings embracing a substantially wedge-shaped recess, means providing a screw-thread for the intermediate portion of the other stamping whereby a bolt may be projected therethrough toward the apex of said wedge-shaped recess, whereby a cylindrical saddle post of any diameter within a range of diameters may be disposed in the recess and gripped on three portions of the post by the screw and by opposite sides of the wedge-shaped recess, and both sets of said extensions being suitable formed in opposed relation whereby to securely grip saddle-supporting reach elements therebetween.

3. In a cycle saddle clamp, a pair of sheet metal stampings, each generally of U-form and having laterally extending jaw extensions, one stamping being inverted with respect to the other and having its said extensions projected through apertures in the arms of the other, the opposing portions of the arms of one of the stampings embracing a substantially wedge-shaped recess, means providing a screw-thread for the intermediate portion of the other stamping whereby a bolt may be projected therethrough toward the apex of said wedge-shaped recess, whereby a cylindrical saddle post of any diameter within a range of diameters may be disposed in the recess and gripped on three portions of the post by the screw and by opposite sides of the wedge-shaped recess, and both sets of said extensions being suitably formed in opposed relation whereby to securely and longitudinally adjustably grip arcuate saddle-supporting reach elements therebetween.

4. In a cycle saddle clamp, a pair of sheet metal stampings, each generally of U-form and having laterally extending jaw extensions, one stamping being inverted with respect to the other and having its said extensions projected through apertures in the arms of the other, the opposing portions of the arms of one of the stampings embracing a substantially wedge-shaped recess, means providing a screw-thread for the intermediate portion of the other stamping whereby a bolt may be projected therethrough toward the apex of said wedge-shaped recess, whereby a cylindrical saddle post of any diameter within a range of diameters may be disposed in the recess and gripped on three portions of the post by the screw and by opposite sides of the wedge-shaped recess, and both sets of said extensions being arcuately formed in opposed relation whereby to securely and longitudinally adjustably grip arcuate saddle-supporting reach elements therebetween.

5. In a cycle saddle clamp, a pair of sheet metal stampings, each generally of U-form and having laterally extending jaw extensions sions, one being inverted with respect to the other and having its said extensions projected through apertures in the arms of the other, the opposing portions of the arms of one of said stampings embracing a substantially wedge-shaped recess therebetween, means providing a screw-thread for the intermediate portion of the other stamping whereby a bolt may be projected therethrough toward the apex of the wedge-shaped recess, both sets of said extensions being arcuately formed in opposed relation whereby to securely and longitudinally adjustably grip arcuate saddle-supporting reach elements therebetween.

In testimony whereof I hereunto affix my signature this 7th day of July, 1930.

JOHN W. BRANDT.